United States Patent Office 3,050,548
Patented Aug. 21, 1962

3,050,548
IMPROVEMENTS IN THE ESTERIFICATION OF TEREPHTHALIC ACID WITH ETHYLENE GLYCOL
Neil Munro and Duncan Maclean, Harrogate, England, assignors to Imperial Chemical Industries Limited, London, England, a corporation of Great Britain
No Drawing. Filed May 12, 1958, Ser. No. 734,391
Claims priority, application Great Britain June 29, 1955
6 Claims. (Cl. 260—475)

This invention relates to an improved process for the manufacture of ethylene glycol esters of terephthalic acid. This application is a continuation-in-part of our applications, Serial Nos. 587,461, now abandoned (filed on May 28, 1956), and 692,584, now abandoned (filed on Oct. 28, 1957).

The preparation of the ethylene glycol ester of terephthalic acid is well known and has led to the production, following a polycondensation reaction, of valuable synthetic fibre and film-forming materials. In practice the preparation of the glycol terephthalate is integrated with the polycondensation and the glycol terephthalate is not isolated prior to conversion to polyethylene terephthalate. Since the provision of terephthalic acid of adequate purity for use in such a polymer making process is rendered very difficult by its intractable character the commercial production of ethylene glycol terephthalate is carried out by the transesterification of a dialkyl terephthalate with ethylene glycol. This route has, of course, the disadvantage of requiring the preliminary esterification of terephthalic acid with a monohydroxy alcohol.

As improved methods for the purification of terephthalic acid are now becoming available attention is again being focussed on the direct esterification (glycolisation) route. The esterification of terephthalic acid with ethylene glycol under atmospheric pressure is described in U.S. specification No. 2,465,319. However, to obtain substantially complete esterification it was found necessary to continue reflux for 72 hours. It is well known to accelerate esterification reactions by the use of a dehydrating catalyst such as a mineral acid or by working with a very large excess of alcohol. With ethylene glycol either of these two devices increases the amount of ether formed by the dehydration of ethylene glycol. This side reaction involves formation of polyglycols according to Equation I.

(I) 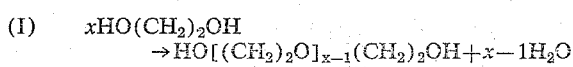

The simplest of these polyglycols is diethylene glycol which may be produced according to Equation II.

(II) 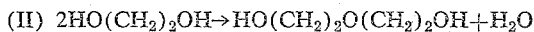

These polyglycols are higher boiling than ethylene glycol so that they are retained in the reaction mixture and since they have hydroxyl end-groups they form terephthalate esters in the same way as the parent ethylene glycol. On polycondensation of the products of esterification a mixed polyester therefore results which is inevitably lower softening than pure polyethylene terephthalate. This lowering in softening point is very undesirable in a fibre forming polyester which has to meet textile requirements such as ironing and heat setting. Furthermore the presence of ether linkages derived from polyglycols in the polymer chain causes poor light and thermal stability in fibres and films.

It will therefore be seen that the ether forming side reaction is a serious problem in the manufacture of ethylene glycol terephthalate in the polymer industry where the polyglycols formed adversely affect the economics and reproducibility of the process and detract from ultimate polyester properties.

The difficulty has, to a considerable extent, been overcome by operating the ethylene glycol/terephthalic acid esterification process under special superatmospheric pressure conditions. Our copending application Serial No. 560,884, now abandoned in favor of copending continuation-in-part application thereof, Serial No. 734,407, filed May 12, 1958, relates to this improved technique. Generally speaking, polyethylene terephthalate samples prepared using ethylene glycol-terephthalic acid molar ratios such as enabled a reasonable rate of reaction (<3 hours) had softening point about 230–240° C. from the conventional atmospheric pressure process and 252–262° C. from the improved superatmospheric pressure process. These softening point figures are equivalent to ether link contents of about 10–14 and 0–4 expressed as mols. percent diglycol respectively. By comparison polyethylene terephthalate made by transesterification of dimethyl terephthalate with ethylene glycol had softening point 260–262° C. and shows no ether link content.

We have now found that if the esterification reaction takes place in the presence of a compound capable of reacting as a base, formation of ether linkages is discouraged. With a strong base such as an alkaline earth compound the effect of retarding ether formation may be achieved by means of only a very small amount of the compound. On the other hand an amphoteric compound such as an oxide of titanium or zirconium requires to be present in larger quantities to exert any marked influence. However, while the effect of weak bases is less it will often suffice together with the improved reaction techniques mentioned earlier to allow eventual production of a polyester free from ether impurity. Furthermore it may sometimes be desirable to use a very small amount of a strong base in conjunction with a larger quantity of a weak base or amphoteric compound. There is experimental evidence in our examples which demonstrates a synergistic effect in such combinations.

In determining the preferred conditions for such stabilisation against etherification it is necessary to consider the effect of the additives on eventual polymer quality, particularly colour. Thermal stability is also important since spinning of polyethylene terephthalate is carried out from the melt at elevated temperatures. It will therefore be apparent that the optimum level of concentration of additive will vary from one case to another. In general, however, we prefer to use up to about 0.5 mols. percent (based on terephthalic acid) of strong bases such as caustic soda or lime when operating under atmospheric pressure and about half that concentration when using the lower ethylene glycol-terephthalic acid ratios made possible by the superatmospheric pressure technique. Alternatively up to about 5 mols. percent of an amphoteric compound such as titanium dioxide or zirconium dioxide may be used without detriment to polymer.

The following examples, in which all parts are by weight, illustrate the nature of our invention.

EXAMPLE 1

In this series of experiments esterification was carried out under atmospheric pressure.

50 parts of terephthalic acid and 168 parts ethylene glycol (molar ration 1/9) were boiled gently for four hours to achieve complete solution of the acid, water formed in the reaction being continuously distilled out via a short column. Excess glycol was then allowed to distil out under atmospheric pressure before the residual glycol esters were polycondensed at 278° C. and 0.5 mm. mercury pressure over a period of 2½ hours. To assist polycondensation a small quantity (0.01 part) antimony trioxide was added after completion of esterification.

The above procedure was carried out several times, the effect of the introduction of a range of basic and amphoteric compounds with the initial terephthalic acid/glycol charge being studied. Table I gives the results obtained.

*Table I*

ATMOSPHERIC PRESSURE ESTERIFICATION

| Additive | Amount Added (Percent wt. of terephthalic acid) | Polyethylene Terephthalate | |
|---|---|---|---|
| | | Softening Point (° C.) | Ether Content (as mols percent diglycol) |
| Nil | Nil | 230 | 14 |
| Caustic Soda | 0.05 | 255 | 4 |
| Do | 0.1 | 259 | 2 |
| Caustic Potash | 0.1 | 257 | 2-4 |
| Do | 0.05 | 257 | 2-4 |
| Disodium hydrogen phosphite | 0.05 | 249 | 6 |
| Disodium hydrogen phosphate | 0.05 | 247 | 6-8 |
| Calcium oxide | 0.05 | 258 | 2-4 |
| Calcium carbonate | 0.1 | 257 | 2-4 |
| Magnesium oxide | 0.05 | 257 | 2-4 |
| Lanthanum oxide | 0.05 | 259 | 2 |
| Zinc oxide | 0.05 | 236 | 11 |
| Do | 0.5 | 245 | 8 |
| Aluminum hydroxide | 0.5 | 250 | 6 |
| Titanium dioxide | 0.5 | 239 | 8-10 |
| Do | 2.5 | 244 | 8 |
| Caustic Soda | 0.05 } | 260 | <2 |
| Titanium dioxide | 0.5 } | | |
| Caustic Potash | 0.05 } | 260 | <2 |
| Titanium dioxide | 0.5 } | | |

The intrinsic viscosity of all these polymers measured in 1% solution in o-chlorophenol at 25° C. was about 0.6.

Ether contents were determined by measurement of the infra-red spectrum between wavelength 2.75 and 3.5 m$\mu$ with particular reference to the absorption due to methylene groups at frequency 2880 cms.$^{-1}$ and the carbonyl overtone at 3460 cms.$^{-1}$. The method is not sensitive to less than 2 mols. percent diglycol.

EXAMPLE 2

In this series of experiments esterification was carried out under superatomspheric pressures using a much lower glycol/acid ratio than in Example 1.

830 parts of terephthalic acid and 620 parts ethylene glycol (molar ratio 1/2) were reacted at 230° C. in a stirred autoclave, pressure being maintained at 35 p.s.i.g. Water formed in the reaction produced a rise in pressure above this level and steam was bled-off to keep the pressure constant. The reaction required 2–2½ hours for completion. The glycol esters were finally polycondensed at 278° C. and 0.5 mm. mercury pressure to give polyethylene terephthalate having intrinsic viscosity 0.60–0.65 (1%, o-chlorophenol, 25° C.), the end point of the polycondensation being determined by increase in power required to turn the agitator in the melt.

To assist polycondensation a small quantity (0.166 part) antimony oxide was added after completion of esterification.

The above procedure was carried out several times, the effect of the introduction of certain basic and amphoteric compounds in the esterification being studied. Table II shows the results obtained.

*Table II*

SUPERATMOSPHERIC PRESSURE ESTERIFICATION

| Additive | Amount Added (Percent wt. of terephthalic acid) | Polyethylene Terephthalate | |
|---|---|---|---|
| | | Softening Point (° C.) | Ether Content (as mols percent diglycol) |
| Nil | Nil | 252 | 4 |
| Caustic Soda | 0.0015 | 257 | 2-4 |
| Do | 0.003 | 259 | 2 |
| Do | 0.02 | 262 | <2 |
| Calcium Oxide | 0.05 | 261.5 | <2 |
| Zinc Oxide | 0.05 | 253.5 | 2-4 |
| Do | 0.5 | 256 | 2-4 |
| Titanium Dioxide | 0.05 | 254 | 2-4 |
| Do | 0.5 | 257.5 | 2 |
| Do | 2.5 | 260.5 | <2 |
| Zirconium Dioxide | 0.5 | 256.5 | 2-4 |
| Disodium Hydrogen Phosphite | 0.05 | 261.5 | <2 |
| Titanium Dioxide | 0.5 } | 260.5 | <2 |
| Calcium Oxide | 0.025 } | | |

These examples clearly demonstrate the beneficial results of the introduction of basic and amphoteric substances into the direct esterification of terephthalic acid with ethylene glycol. Consideration of the characteristics of polyethylene terephthalate obtained from the various glycol terephthalate esters shows that a softening point improvement of as much as 30° C. has been achieved in some instances e.g. by the combined use of caustic alkali and titanium dioxide in atmospheric pressure reaction. In the second series softening point values are, of course, generally higher but it should be noted that at ethylene glycol-terephthalic acid molar ratio 2/1 a polyester equivalent in softening point and ether content to that made by trans-esterification has been obtained in the presence of calcium oxide and/or titanium dioxide.

What we claim is:

1. A method of esterifying terephthalic acid with ethylene glycol comprising heating a mixture consisting essentially of terephthalic acid and from 1 to 3 molar proportions of ethylene glycol at a temperature between 197° and 300° C. and under a superatmospheric pressure of at least about the partial vapor pressure of ethylene glycol but not exceeding the sum of the partial vapor pressures of the said ethylene glycol and the water produced in the reaction, said partial vapor pressures being those at the temperature of the reaction, and inhibiting the dehydration of ethylene glycol to form polyethylene glycol by adding a catalytic amount of an inorganic alkali.

2. A process according to claim 1 wherein said inorganic alkali is an alkaline earth compound.

3. A process according to claim 1 wherein said inorganic alkali is a member of the group consisting of caustic soda, caustic potash, disodium hydrogen phosphate, disodium calcium phosphate, calcium oxide, calcium carbonate, magnesium oxide, and lanthanum oxide.

4. A process according to claim 1 wherein said inorganic alkali is present in an amount of about 0.5 mol percent, based on said terephthalic acid.

5. A process according to claim 1 wherein an amphoteric compound is also present with said inorganic alkali.

6. A process according to claim 5 wherein the amphoteric compound is a member of the group consisting of titanium and zirconium oxides.

References Cited in the file of this patent

UNITED STATES PATENTS

| | | |
|---|---|---|
| 2,562,878 | Blair | Aug. 7, 1951 |
| 2,739,957 | Billica et al. | Mar. 27, 1956 |
| 2,794,794 | Schlatter et al. | June 4, 1957 |
| 2,821,542 | Schmutzler | Jan. 28, 1958 |
| 2,828,290 | Caldwell | Mar. 25, 1958 |

FOREIGN PATENTS

| | | |
|---|---|---|
| 610,137 | Great Britain | Oct. 12, 1948 |